United States Patent [19]

Kelley

[11] Patent Number: 4,726,285
[45] Date of Patent: Feb. 23, 1988

[54] DIMPLED AIR DISTRIBUTION DEVICE

[76] Inventor: Winfield L. Kelley, 1581 Brickell Ave., Miami, Fla. 33129

[21] Appl. No.: 937,060

[22] Filed: Dec. 2, 1986

Related U.S. Application Data

[63] Continuation-in-part of Ser. No. 788,124, Oct. 16, 1985, abandoned.

[51] Int. Cl.⁴ .............................................. F24F 13/06
[52] U.S. Cl. .................................... 98/40.11; 98/40.01; 98/40.1; 98/41.3
[58] Field of Search ................... 98/33.1, 40.01, 40.02, 98/40.1, 40.11, 40.16, 40.18, 41.3

[56] References Cited

U.S. PATENT DOCUMENTS

| | | |
|---|---|---|
| Re. 25,216 | 8/1962 | Kennedy . |
| Re. 26,723 | 11/1969 | Averill et al. . |
| 1,602,048 | 10/1926 | Seibel .................... 98/40.18 X |
| 2,640,412 | 6/1953 | Sweger . |
| 2,714,808 | 8/1955 | Owen et al. ............ 98/40.02 X |
| 2,730,866 | 1/1956 | Baker et al. ............ 98/40.02 X |
| 2,807,992 | 10/1957 | Elman . |
| 2,909,112 | 10/1959 | Yousoufian . |
| 3,308,741 | 3/1967 | Chambers ................ 98/40.11 |
| 3,780,503 | 12/1973 | Smith . |
| 3,818,815 | 6/1974 | Day . |
| 3,835,759 | 9/1974 | Lloyd .................... 98/40.02 X |
| 3,948,155 | 4/1976 | Hedrick . |
| 4,316,406 | 2/1982 | Lind . |
| 4,319,520 | 3/1982 | Lanting et al. . |
| 4,366,525 | 12/1982 | Baumgartner ............ 98/40.02 X |
| 4,407,187 | 10/1983 | Horney . |

FOREIGN PATENT DOCUMENTS

| | | | |
|---|---|---|---|
| 732070 | 2/1943 | Fed. Rep. of Germany ..... 98/40.02 |
| 916916 | 3/1982 | U.S.S.R. ......................... 98/40.01 |
| 1083034 | 3/1984 | U.S.S.R. ......................... 98/40.01 |

Primary Examiner—Harold Joyce
Attorney, Agent, or Firm—Stevens, Davis, Miller & Mosher

[57] ABSTRACT

An air distribution apparatus having a plurality of dimples, each having small openings. The dimples having small openings provide a simple structure for causing air to be discharged from the air diffuser unit parallel to the base of the unit.

17 Claims, 13 Drawing Figures

FIG. 10
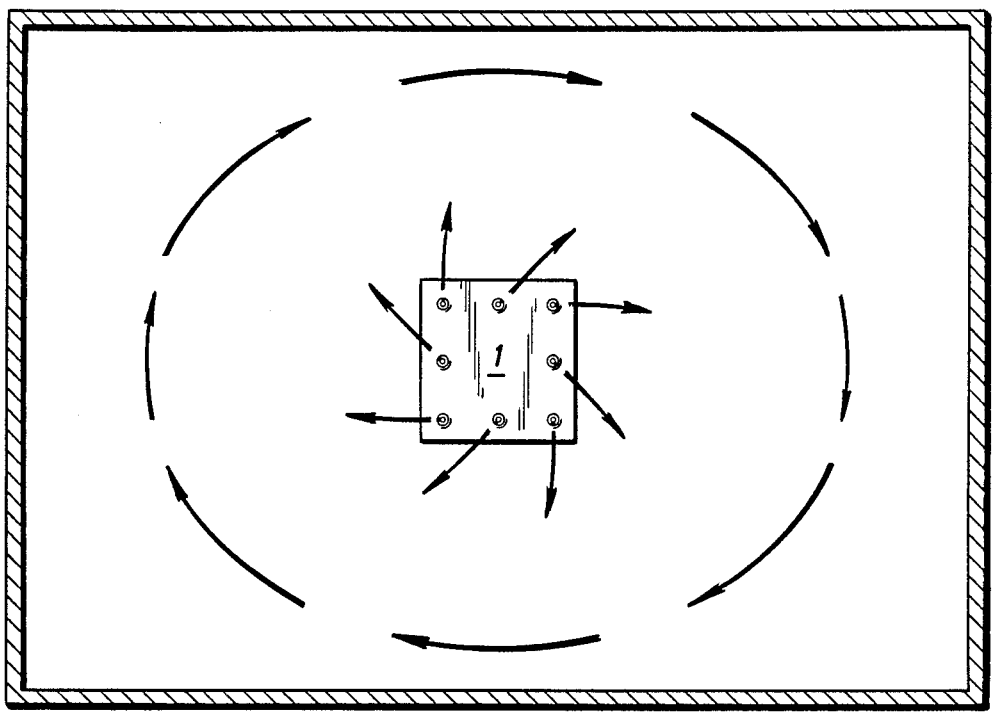
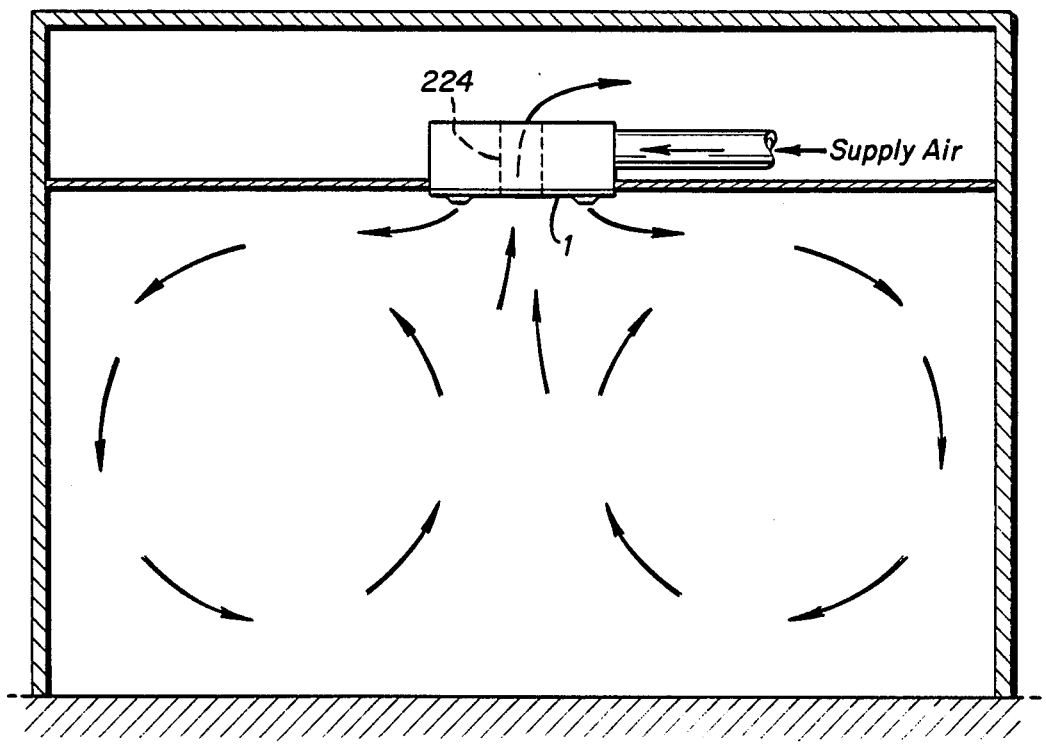
FIG. 11

DIMPLED AIR DISTRIBUTION DEVICE

BACKGROUND OF THE INVENTION

1. Field of the Invention

This invention is a continuation-in-part application of U.S. Ser. No. 788,124, filed Oct. 16, 1985 now abandoned.

The invention relates to an air distribution device having a dimpled diffuser plate wherein the dimples are provided with small openings. The dimples with openings provide for greater lateral distribution of air, which provides for a more efficient and a greater and a more even distribution of air.

2. Discussion of the Prior Art

There are known devices for adjusting and directing the flow of air from an air duct past an air diffuser device. However, these devices generally do not provide for the lateral distribution of air or do not accomplish such a result in the manner in which the present invention does. For example, U.S. Pat. No. 4,407,187 to Horney discloses an air distribution device having an apertured meter plate and a face plate with a plurality of orifices. The orifices of the face plate are directed outwardly and downwardly. However, the device does not provide for the lateral distribution of air and air is deflected over the narrow area determined by the outward and downward direction of the orifices.

U.S. Pat. No. 3,818,815 to Day discloses an air diffuser unit having overlapping perforated damper plates and a perforated face plate. The damper plates are movable relative to one another and are used to control air volume and air distribution patterns. This device, however, cannot be easily adjusted to provide for airflow in a single or in multiple directions. The device is also relatively complicated in view of the simple structure of the instant invention.

U.S. Pat. No. 2,909,112 to Yousoufian is directed to an air distribution device having a face plate wherein two sets of louvers are positioned on four quadrants of the face plate. The vanes of the louvers can be positioned to direct airflow in a lateral direction. However, the use of such a device does not provide for the efficient distribution of air, as airflow originating from one quadrant is forced to collide with airflow originatig from a second quadrant.

U.S. Pat. No. 2,640,412 to Sweger discloses the use of air deflecting vanes positioned on a grill to deflect or to direct an air stream in a desired direction. The vanes in a closed position are perpendicular to the flow of air which exits from the air duct. The vanes are opened by axially pressing on them anywhere off-center of the vane. This action forces the vane to be displaced from the perpendicular position, allowing for deflection of air. The vanes are also rotatable. However, such a construction does not provide for the lateral deflection of airflow, which would serve to direct air over a much greater area.

U.S. Pat. No. Re. 26,723 to Averill discloses an air deflector composed of four rectangular quadrants each having webs and openings for distributing air. An airflow appears to be discharged lateral to the axis of the diffuser unit, but the structure again is relatively complicated in view of the simple structure of this invention.

SUMMARY OF THE INVENTION

The apparatus of this invention relates to an air distribution device composed of an air diffuser plate, an angle deflection plate, a damper and a plenum chamber. The top face of the diffuser plate is connected at the outlet end of a plenum chamber and the inlet of the plenum chamber is connected to an air duct. The angle deflection plate overlays the diffuser plate. The bottom of the air diffuser plate has a set of dimples and the dimples are provided with small elliptical-shaped openings set into their side. The angle deflection plate or the apparatus is flat on both of its faces and is provided with a plurality of openings. These openings are generally in register with the openings of the dimples. The damper plate is also provided with a plurality of openings. To achieve a maximum amount of airflow through the apparatus to a room or other enclosed area, the damper plate openings are aligned or are in register with the openings of the angle deflection plate and the elliptical openings of the diffuser plate. Where decreased quantities of airflow are needed or desired, the damper plate is slidably moved relative to the angle deflection plate so that its openings are only in partial register with the openings of the angle deflection plate or fully in register with a portion of the openings in the angle deflection plate and fully out of register with the remaining portion of the openings in the angle deflection plate. To arrest completely the airflow, the openings of the damper are slidably moved to be completely out of alignment relative to the openings of the angle deflection plate.

The elliptical openings of the diffuser plate provide an airflow which is substantially parallel or lateral to the base of the plenum chamber. This lateral airflow provides a more efficient distribution of air by distributing air over a greater area than conventional airflow devices. The dimples of the diffuser can be constructed to be rotatable relative to the angle deflection plate. Such a construction provides for easy manipulation of the direction of the airflow.

Accordingly, it is an object of this invention to provide an airflow apparatus which distributes air laterally relative to a chamber from which the airflow emanates.

Another object of this invention is to provide an airflow device of simple construction.

Another object of this invention is to provide an apparatus which more efficiently distributes air to an enclosed area.

Another object of this invention is to provide an airflow apparatus wherein the direction of the airflow can be easily changed.

Another object of this invention is to provide an apparatus to control air volume.

Another object of this invention is to provide apparatus for variable directional air patterns.

Other objects of this invention will be readily apparent by reference to the appended drawings and the description of the preferred embodiments, as provided below.

BRIEF DESCRIPTION OF THE DRAWINGS

FIG. 10 shows the airflow distribution device of this invention in a cyclone pattern; and FIG. 11 shows the airflow distribution device of this invention in a different cyclone pattern.

DESCRIPTION OF THE PREFERRED EMBODIMENTS

Figure 1:
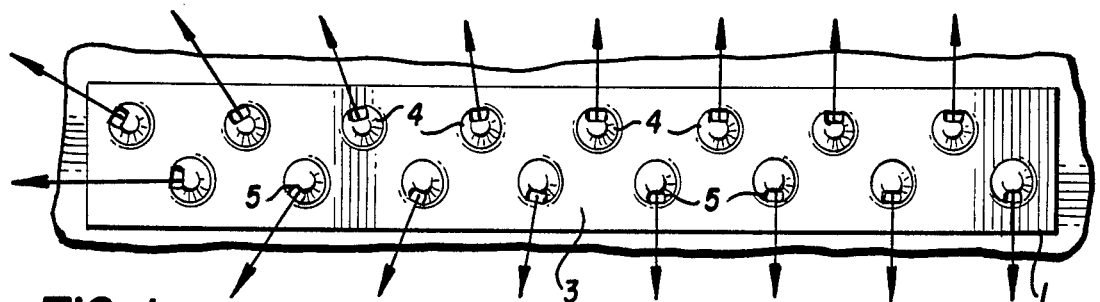
FIG. 1 is a bottom view of the airflow distribution device of this invention showing the top of a diffuser plate having dimples with small openings.
Figure 2:
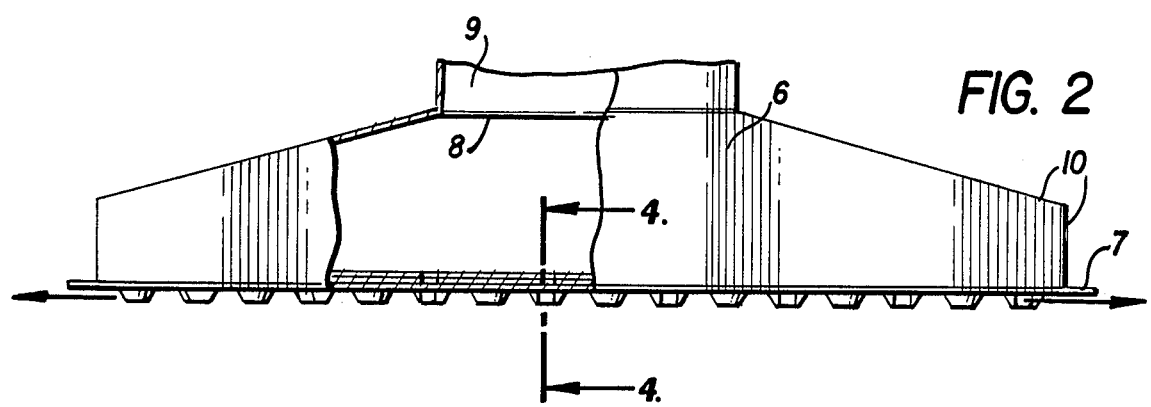
FIG. 2 is a side view, partly in cross-section, of a plenum chamber to which the diffuser plate is attached.
Figure 3:
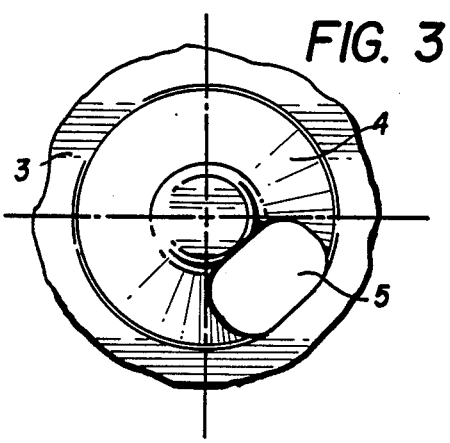
FIG. 3 is a magnified view of a dimple of the diffuser plate of FIG. 1.
Figure 4:
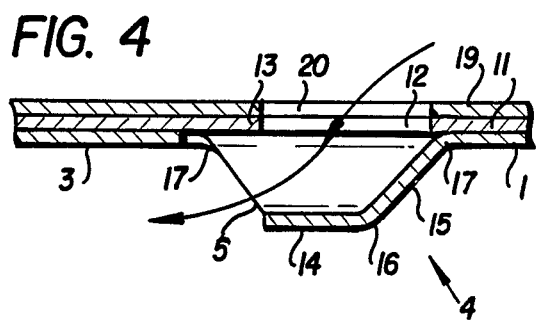
FIG. 4 is a cross-section of a dimple along line 4—4 of FIG. 2 showing an angle deflection plate and a damper, both having openings in register with the dimple opening.

FIGS. 1-5 show a first embodiment of the air diffuser unit of this invention. With reference to FIGS. 2 to 4, the apparatus of this invention is composed of a plenum chamber 6 having walls 10 which define a base 7. Attached to the base 7 of the plenum 6 is a stationary diffuser plate 1, which is flat on its top face 2 and has protruding dimples 4 on its bottom face 3. The dimples are hemispherical-type structures. A single dimple forms a chamber 23 and is composed of a crown 14 which is a rounded flat apex, sloping walls 15 which emanate from the end portion of the crown 14 forming a crown/wall interface 16, and wherein the sloping walls terminate at a flat portion of said diffuser plate 1 forming a wall/plate interface 17. The dimples deviate from a true hemispherical shape, in that not all points on the sphere are an equal distance from the center of the diameter of the dimples. This deviation is due to the crown 14 or flat apex of the dimples. However, the dimples are not limited to structures of this type, but could be square, rectangular, or of other spheriodal or circular shapes.

The dimples are provided with relatively small openings 5. The term "relatively small" simply means openings which cover an area smaller than a fourth of the entire dimple 4, as shown in FIG. 3. The openings 5 are further defined as extending from the crown/wall interface 16 of the dimple and terminate at the wall/plate interface 17. The dimples, plenum chamber, damper and angle deflection plate are preferably constructed of sheet metal, but could be made out of material such as glass, plastic, plexiglass or the like. The dimples are formed by stamping the sheet metal with a die. The number of dimples and the area that they cover on the face plate can be optimally determined by computer means. The dimples can be constructed to have their openings face in a single direction as shown in the top or bottom right portions of FIG. 1 or can be positioned in a plurality of directions.

The openings 5 of the dimples are elliptically-shaped openings. However, the invention is not limited to an apparatus wherein the boundaries of the dimple openings form a plane at which the sum of distances from a fixed pair of points, the foci, is a given constant. Rather, the openings are described as elliptically-shaped in view of the fact that they are not perfect circles, although circular-shaped openings, true elliptical openings and other geometrically-shaped openings can be envisioned for such dimples.

Overlapping the diffuser plate 1 is an angle deflection plate 11. This plate is flat on both faces and has openings 12, which coincide in number to the number of dimples on the diffuser plate. As shown in FIG. 4, the openings of the angle deflection plate 12 are generally in register with the dimples 4. However, a solid portion 13 of the angle deflection plate 11 directly overhangs the openings of the dimples. The solid portion 13 causes moving air to travel around it and prevents moving or forced air from flowing past a dimple opening 5 in a downward path. The angle deflection plate 11 is also stationary, and can be welded to the plenum walls 10 or attached by any number of means to the diffuser plate 1.

Figure 5:
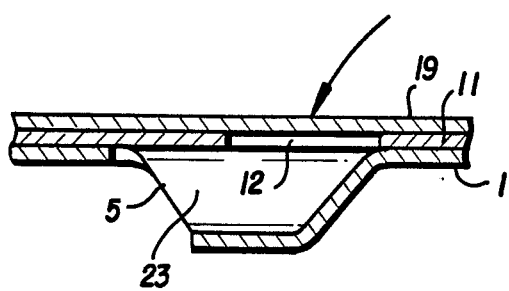
FIG. 5 shows a similar cross-section of the dimple wherein the damper openings are out of register with the openings of the angle deflection plate.

Overlaying the stationary flat angle deflection plate 11 is a damper means 19. Generally, the damper 19 is flat and has openings 20. The damper is slidable relative to the fixed diffuser plate 1, angle deflection plate 11, and plenum 6. The openings 20 of the damper 19 also coincide with the number of dimples on the diffuser plate. The openings of the damper are spaced a distance equivalent to the distance between openings in the angle deflection plate, and are the same size. When the openings of the angle deflection plate and the openings of the damper are in full register with one another, as shown in FIG. 4, a maximum quantity of air is deflected around the overhanging solid portion 13 of the angle deflection plate 11 and is conveyed through the dimples substantially parallel to the base 7 of plenum 6. When the damper is slid into the position as shown in FIG. 5, the flow of air to the dimple is stopped. However the airflow is not limited to a maximum and a zero amount of flow, but can be regulated from a zero to a maximum amount by slidably placing the damper plate openings in positions between the extreme positions shown in FIGS. 4 and 5. The damper plate is made slidable by means familiar to those of skill in the art.

The solid portion 13 of the angle deflection plate 11, which overhangs the small openings of the dimples, and the structure of the dimples having relatively small openings, as described above, provide for the deflection of a current of air that is substantially parallel to the base of the plenum chamber. Substantially parallel refers to the angle at which an air stream passes through the openings of the dimple relative to the base of the plenum chamber. The angle created is on the order of 80° to 90°. This lateral deflection of air ensures that air passing through air duct 9, attached to the inlet 8 of the plenum chamber 6, is distributed over a greater area of a room or enclosure in which the air diffuser apparatus is located. The employment of the apparatus can lead to energy savings, or to the decrease in the number of air distribution devices needed per room or structure.

A second embodiment of the invention is directed to an airflow distribution apparatus having rotatable dimples 104 with relatively small openings 105. Such an apparatus is similar to the apparatus as described above. For instance, the apparatus has a plenum chamber which has walls which define a base. Attached to the base of the plenum is an air diffuser plate 101 with dimples 104. Positioned above the diffuser plate 101 is an angle deflection plate 111, and overlaying the angle deflection plate and slidable relative thereto is a damper 119. The plenum is connected to an air duct, which delivers an airflow through the plenum chamber out the openings 105 of the dimple 104.

In this embodiment however, the solid portion 113 of the angle deflection plate 111 overlays a greater portion of the dimple chamber 123. This is best shown by comparing the position of the angle deflection plate 11 of FIG. 4 and the angle deflection plate 11 of FIG. 6. Covering the dimple chamber 123 in this manner ensures that a forced air stream moves around the solid portion 113 of the angle deflection plate, and is deflected laterally by the dimple even when the dimple has been rotated 180° from its position shown in FIG. 6.

Figure 6:
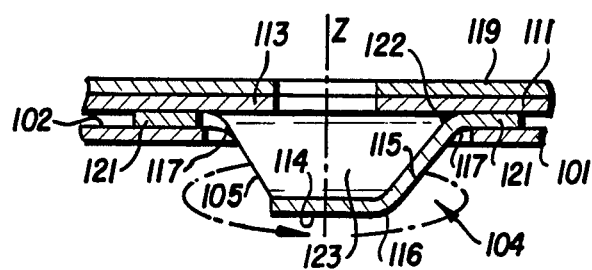
FIG. 6 shows an alternate embodiment of a dimple that is rotatable between the diffuser plate and the flat angle deflection plate.

The rotatable dimples 104 are shown in FIG. 6. The dimples are provided with a rounded flat apex or crown 114. Sloping walls 115 emanate from the end portion of the crown 114, forming a crown/wall interface 116. The walls, just before a terminating end 121, have a curved portion 122 which curves around the diffuser plate 101, forming a wall/curve interface 117. The terminating ends 121 flatten out and overlay the bottom face 102 of the diffuser plate. The angle deflection plate 111 overlays the terminating ends 121 and is secured to the plenum chamber or to the diffuser plates so that the terminating ends of the dimples are frictionally sandwiched by the angle deflection plate and the diffuser plate. No other means secures the terminating ends, and thus a non-perpendicular force applied to the dimples anywhere off-center of an apex of a dimple cause the dimple to rotate about its axis Z. The dimples are prevented from sliding laterally by the wall/curve interface 117 which inherently prevents such motion. Relatively small openings 105 allows forced air to exit from the dimples. These small openings are of a similar area to those described in embodiment one, and extend from the crown/wall interface 116 to the wall/curve interface 117.

A damper plate 119 having openings, slidably overlays the angle deflection plate and can be adjusted, as in embodiment one, to provide for an increase or decrease in the volume of air to be delivered to an enclosed area. The rotatable dimples of this second embodiment can be adjusted so that their openings point in any number of directions, or in a single direction.

Figure 7:
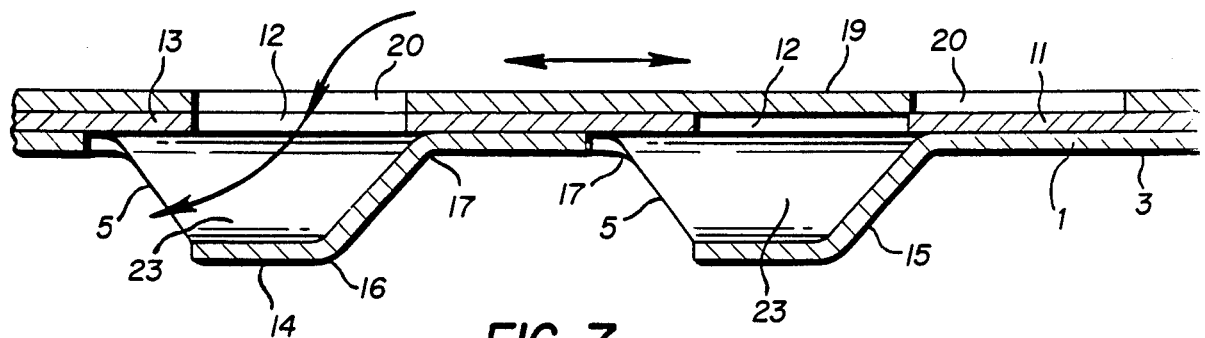
FIG. 7 is a cross-section of the device of this invention showing simultaneously open and closed dimples.
Figure 8A:
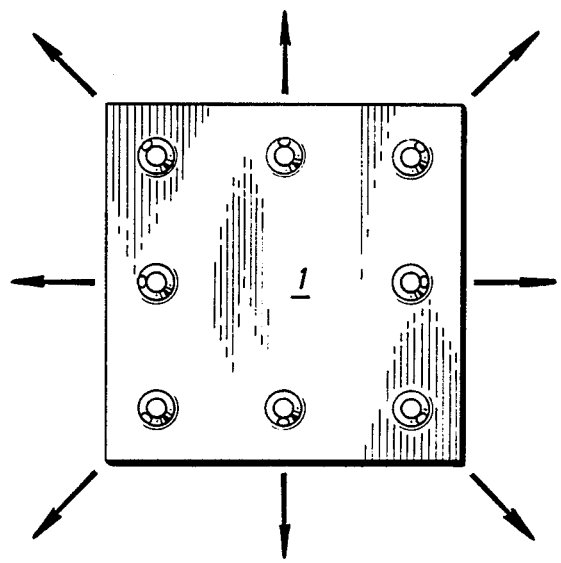
FIGS. 8a and 8b show the airflow distribution device of this invention in a completely open and partially open condition, respectively.
Figure 8B:
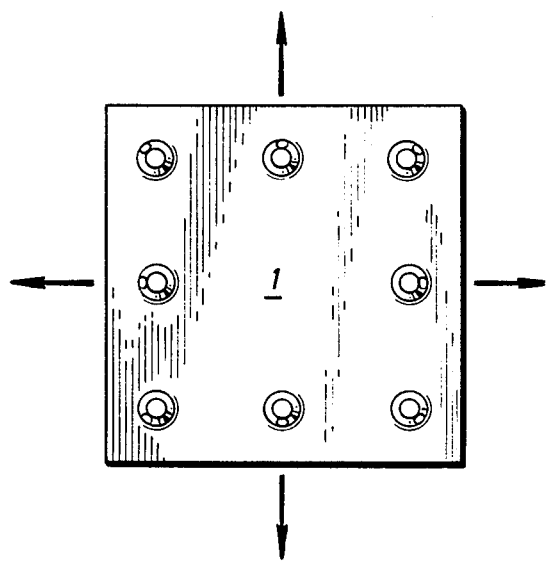

FIGS. 7, 8a and 8b show an embodiment where a portion of the holes in damper plate 19 are in registry with the holes in the angle deflection plate 11 while a portion are not. In this embodiment sufficient outlet velocities of air are able to be maintained in order to have proper room circulation while at the same time reducing air volume.

Figure 9A:
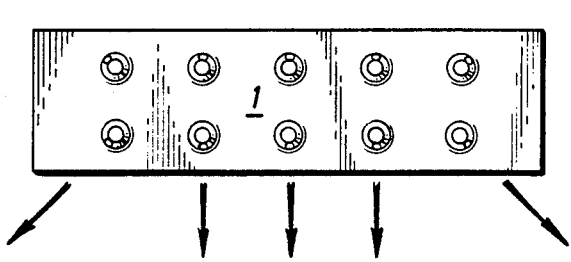
FIGS. 9a and 9b show the airflow distribution device of this invention in a variable directional air pattern.
Figure 9B:
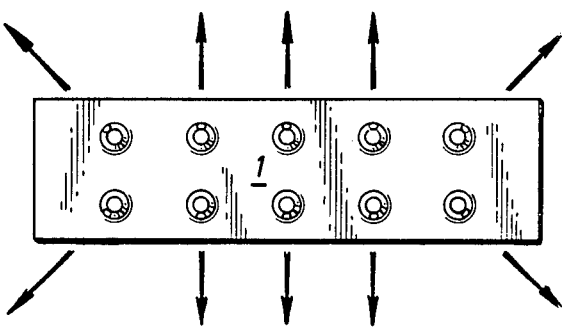

FIGS. 9a and 9b show another embodiment where a variable directional air pattern is accomplished by the damper plate 19 being positioned to allow air to pass through openings which are oriented in a desired discharge direction at a given point in the linear movement of the damper plate 19.

FIG. 10 shows an embodiment in which the air circulation has a "cyclone" effect. The air is discharged tangent to the radius of the dimples of the diffuser plate in either a clockwise or counterclockwise direction. This effect may be further enhanced by the addition of a return air opening 224 in the center of the diffuser. This allows the warm return air to rise in the core of the "cyclone" and exit from the room to the fan via a ceiling plenum or duct.

Damper plate 19 may be used as a fire and/or a smoke damper either independently or in conjunction with all of the foregoing arrangements and uses. The damper plate 19 is activated by conventional devices such as fuse links and smoke detectors.

When automatic temperature control is used to position damper plate 19, and the supply duct is used for heating and cooling, then a "Heating-Deadband-Cooling" sequence is accomplished in a single linear stroke by allowing damper plate 19 to continue its travel in the same direction, after closing the cooling, to pass through a deadband and re-open for heating. On a rise in room temperature, the reverse sequence occurs.

While specific embodiments of the apparatus of this invention have been shown and described, it should be apparent that many modifications can be made thereto without departing from the spirit and scope of the invention. Accordingly, the invention is not limited by the foregoing description, but is only limited by the scope of the claims appended thereto.

I claim:

1. An airflow distribution device comprising:
    a plenum chamber having an inlet and an outlet and walls for confining a flow of air, whereby said walls form a base at said outlet;
    a stationary diffuser plate connected to said base positioned over said outlet of said plenum chamber, said stationary diffuser plate having a plurality of dimples, each of said dimples having a side opening; and
    a flat angle deflection plate having a plurality of openings positioned within said plenum chamber and over said diffuser plate, said plurality of openings of said flat angle deflection plate being in communication with openings of said dimples of said stationary diffuser plate but do not overlay a horizontal projection of said openings in said diffuser plate for distributing air substantially parallel to said base of said airflow distribution device.

2. The airflow distribution device of claim 1, wherein said dimples comprise a crown, sloping walls emanating from said crown forming a crown/wall interface, and wherein said walls terminate at a flat portion of said diffuser plate, forming a wall/plate interface.

3. The airflow distribution device of claim 2, wherein said side opening in each of said dimples is a relatively small opening occurring from said crown/wall interface to said wall/plate interface.

4. The airflow distribution device of claim 2, wherein all said openings of said dimples face in a single direction.

5. The airflow distribution device of claim 2, wherein said openings of said dimples face in a plurality of directions.

6. The airflow distribution device of claim 1, wherein said side opening in each said dimple is an elliptically-shaped opening.

7. The airflow distribution device of claim 1, further comprising a slidably mounted plate having a plurality of openings registrable with the openings of said flat angle deflection plate overlaying said flat angle deflection plate.

8. The airflow distribution device of claim 1, wherein said diffuser plate has openings therein and each of said dimples has a circumferential flange rotatably mounted between said diffuser plate and said flat angle deflection plate, said dimples extending through said openings in said diffuser plate.

9. The airflow distribution device of claim 8, wherein said dimples comprise a crown, a sloping wall emanating from said crown forming a crown/wall interface, and wherein said wall has a curve forming a curve/wall interface whereby a terminating end of said sloping wall curves over said diffuser plate and said terminating end flattens out being positioned between said diffuser plate and said flat angle deflection plate, whereby said dimples are rotatable relative to said diffuser plate.

10. The airflow distribution device of claim 9, wherein said side openings in said dimples are relatively small openings from said crown/wall interface to said curve/wall interface.

11. The airflow distribution device of claim 7, wherein said slidably mounted plate simultaneously has a portion of said plurality of openings registrable with the openings of said flat angle deflecting plate and a portion of said plurality of registrable openings not registrable with the openings of said flat angle deflection plate.

12. The airflow distribution device of claim 11 wherein the side opening of said dimples are undirected whereby the portion of said plurality of openings in the slidably mounted plate in registry with the openings of said flat angle deflection plate and dimples creates a unidirectional air discharge.

13. The airflow distribution device of claim 11 wherein the side opening of said dimples are multidirected whereby the portion of said plurality of openings in the slidably mounted plate in registry with the openings of said flat angle deflection plate and dimples creates a multidirectional air discharge.

14. The airflow distribution device of claim 11 wherein the side opening of said dimples are tangentially directed to the radius of the diffuser plate whereby the openings of the slidably mounted plate in registry with the openings of said flat angle deflection plate and dimples discharge air tangent to the radius of the diffuser plate in a circular direction.

15. The airflow distribution device of claim 11 defining peripherally arranged air distribution openings and a centrally positioned air return.

16. The airflow distribution device, comprising:
a plenum chamber having an inlet and an outlet and walls for confining airflow, said walls defining a base at said outlet;
a stationary diffuser plate connected to said base positioned over said outlet of said plenum chamber, said stationary diffuser plate having a plurality of dimples, each of said dimples having a relatively small side opening; and
a flat angle deflection plate, having a plurality of openings, positioned within said plenum chamber and over said diffuser plate, said plurality of openings of said flat angle deflection plate being in communication with said plurality of openings of said stationary diffuser plate, and wherein said openings in said flat angle deflection plate do not overlay a horizontal projection of said openings of said diffuser plate for distributing air substantially parallel to said base of said airflow distribution device.

17. The airflow distribution device of claim 16, further comprising a slidably mounted plate having a plurality of openings registrable with the openings of said flat angle deflection plate overlaying said flat angle deflection plate.

* * * * *